(12) United States Patent
Mallory (10) Patent No.: US 6,925,753 B1
(45) Date of Patent: Aug. 9, 2005

(54) LANDSCAPE EDGING

(76) Inventor: Kenneth Wayne Mallory, 85 W. Laramie Dr., Reno, NV (US) 89521

( * ) Notice: Subject to any disclaimer, the term of this patent is extended or adjusted under 35 U.S.C. 154(b) by 0 days.

(21) Appl. No.: 10/666,769

(22) Filed: Sep. 17, 2003

Related U.S. Application Data (60) Provisional application No. 60/411,551, filed on Sep. 17, 2002.

(51) Int. Cl.[7] .................................................. A01G 1/08
(52) U.S. Cl. ............................... 47/33; 239/201; 404/6
(58) Field of Search ........................... 47/33; 57/102; 239/201; 404/6, 7

(56) References Cited

U.S. PATENT DOCUMENTS

| | | | |
|---|---|---|---|
| 4,761,923 A | * | 8/1988 | Reum et al. .................. 52/102 |
| 4,945,675 A | * | 8/1990 | Kendrick ........................ 47/33 |
| 5,442,877 A | * | 8/1995 | Lindhal ........................... 47/33 |
| 6,138,405 A | * | 10/2000 | Matz .............................. 47/33 |

FOREIGN PATENT DOCUMENTS

| | | | | |
|---|---|---|---|---|
| FR | 2565063 A1 | * | 12/1985 | ............ A01G 1/08 |

* cited by examiner

*Primary Examiner*—Jeffrey L. Gellner
(74) *Attorney, Agent, or Firm*—Sierra Patent Group, Ltd.

(57) ABSTRACT

The disclosure is directed towards a landscape edging system includes a first edging component having a body. The body having a base and a form disposed in the base. The base includes at least one coupling element formed in the base. The at least one coupling element is configured to couple to another coupling element formed in a second body of a second edging component. The first edging component is configured to couple to the second edging component in a serial arrangement. The serial arrangement is repeatable along a length of a landscape feature.

17 Claims, 11 Drawing Sheets

LANDSCAPE EDGING

PRIORITY CLAIM

This application claims priority to Provisional Patent Application No. 60/411,551 filed with the United States Patent and Trademark Office on Sep. 17, 2002.

BACKGROUND

The present disclosure relates to the field of landscaping. In particular, the disclosure relates to a system for landscape edging.

Landscaping often includes a variety of features such as grass lawns, shrubbery, flower gardens, vegetable gardens and walkways. Lawns and gardens often abut other landscape features, such as sidewalks and plantings, along common borders. In an attempt to separate and protect the various landscape features a physical boundary or edging is placed between the landscape features. Some past solutions for the physical boundary included plastic vertical strips of material inserted at the boundary of the landscape features. Metal sheet materials and wood planks have been substituted for the plastic. A vertical peg or anchor was used to support the vertical sheet material along the boundary. The sheets and strips allowed for a flexible system of edging. Unfortunately, this edging can become loose and dislodge or raise up out of the ground or fall over to one side. The wood and metal also deteriorate over time and do not allow for an easy interface with lawn mowing equipment.

Another edging used in the past has been a continuous concrete curbing poured onsite between the landscape features. The continuous concrete edging often has a curved profile that allows for ease of use of lawn mowing equipment. As an example, a concrete curbing machine would be brought onsite. A furrow would be created along the boundary of the lawn and shrubbery beds. The concrete curbing machine could then lay down a continuous curbing or edging of concrete. The concrete would then set, and a sturdy edging would be in place. However, if the landscape needed to be altered, the concrete edging would have to be broken up and removed, such that it would not be reused. Fresh concrete would have to be poured in order to construct the new edging. In addition to the need for specialized concrete equipment to be onsite, minimum quantities of edging are required in order to engage a contractor to bring the equipment onsite to lay down the edging. For example, a homeowner would need to lay down at least one hundred feet of edging as a minimum, to get the contractor to bring the equipment and lay down the edging.

What is needed in the landscaping art is a sturdy, lawn equipment compatible, multi-configurable, reusable system for landscape edging.

SUMMARY

The disclosure is directed towards a landscape edging system comprising a first edging component having a body. The body having a base and a form disposed in the base. The base includes at least one coupling element formed in the base. The at least one coupling element is configured to couple to another coupling element formed in a second body of a second edging component. The first edging component is configured to couple to the second edging component in a serial arrangement. The serial arrangement is repeatable along a length of a landscape feature.

The disclosure is directed toward another embodiment of a landscape edging system. The landscape edging system comprises a first edging component having a body including a base. The base includes a first end and a second end opposite the first end. The base includes an upper surface and a lower surface opposite the upper surface. A form is disposed on the upper surface of the base, wherein the lower surface is configured to contact a ground feature. The form includes at least one conduit disposed in the form. At least one coupling member is configured to demountably couple with the first edging component proximate one of the first end and the second end. The at least one coupling member including a body having a side wall mounted on a coupling base. A mating portion is disposed in the side wall and is configured to couple with the first edging component. The coupling base is configured to anchor to the ground feature.

A method of using landscape edging is disclosed. The method includes preparing a ground feature. The method includes disposing a first edging component on the ground feature, the first edging component including a body having a base, the base including a first end and a second end opposite the first end. The base including an upper surface and a lower surface opposite the upper surface. A form is disposed on the upper surface of the base wherein the lower surface is configured to contact the ground feature. The form includes at least one conduit disposed in the form. The method includes mounting a first coupling member to the first end of the first edging component. The first coupling member is configured to demountably couple with the first edging component proximate one of the first end and the second end. The at least one coupling member includes a body having a side wall mounted on a coupling base. The at least one coupling member includes a mating portion disposed in the side wall and configured to couple with the first edging component. The coupling base is configured to anchor to the ground feature. The method includes anchoring the coupling base to the ground feature. The method includes mating a second edging component to the first coupling member, wherein the second edging component includes a body having a base. The base includes a first end and a second end opposite the first end and the base includes an upper surface and a lower surface opposite the upper surface. A form is disposed on the upper surface of the base wherein the lower surface is configured to contact the ground feature. The form includes at least one conduit disposed in the form. The method includes coupling the first edging component conduit with a second edging component through the coupling member.

BRIEF DESCRIPTION OF THE DRAWING FIGURES

FIG. 28 is a top view of an exemplary edging component with various irrigation fixtures and an electrical knockout.

DETAILED DESCRIPTION

Persons of ordinary skill in the art will realize that the following description of the present invention is illustrative only and not in any way limiting. Other embodiments of the invention will readily suggest themselves to such skilled persons having the benefit of this disclosure.

The disclosure describes a landscape edging system that incorporates individual edging components into a complete landscape edging system. The edging components include a base supporting a form. The edging components include a coupling member that couples one edging component to another edging component. The edging components can anchor to ground features. The edging components can include conduits that communicate between the edging components. The conduit can facilitate the flow of fluids as well as carry electrical and optical conductors. The edging components can include light fixtures and irrigation equipment. The landscape edging system can cover various landscape features, supply water and light along the landscape features as well as provide a flexible and durable boundary.

Figure 1:
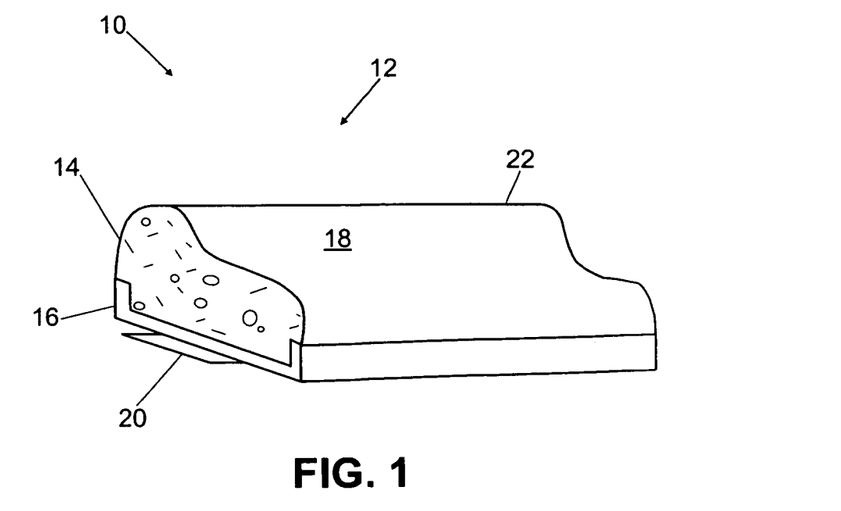
FIG. 1 is a perspective view of an exemplary edging component.

FIG. 1 illustrates a perspective view of an exemplary edging component.

A landscape edging system 10 (or simply edging system) can be made of multiple components interlocked or otherwise fixed together in a detachable form. The edging system 10 can include edging components 12, such as the exemplary edging component 12 illustrated in FIG. 1. The edging component 12 includes a body 14. The body 14 has a platform (or base) 16 coupled to a form 18. The base 16 can comprise a plastic plate or sheet formed into a container shape or a U-shaped profile. The body also includes at least one coupling element or coupling member 20 and preferably two coupling elements 20 configured to couple with an adjacent coupling element of an adjacent edging component 12 in the edging system 10. The form 18 is preferably concrete material poured into the base 16 and having a top surface 22 shaped in a crown or undulated curve shape that is both aesthetic and functional for lawn equipment. Of course other materials are acceptable such as composites, plastics, polymers, and the like for the form 18.

Figure 2:
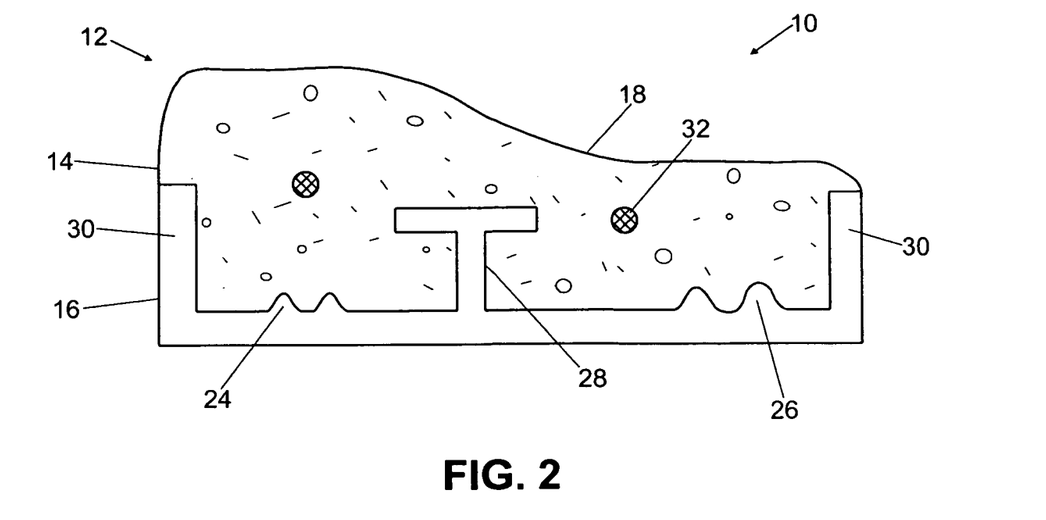
FIG. 2 is a cross section side view of an exemplary edging component.

Referring to FIG. 2, an exemplary edging component 12 is shown in a cross section side view. The base 16 can include any variety of discontinuities or stiffening members 24 along its surface that provide strength and rigidity to the body 14. For example and by no means limiting the variety, an undulated discontinuity 26 or a T-shaped discontinuity 28 can serve as a stiffening member 24. The base 16 can include sides (or walls) 30. In another exemplary embodiment, the base 16 may not have sides. A reinforcement member 32, such as rebar, can be disposed in the form 18 to provide tensile strength to the edging component 12.

Figure 3:
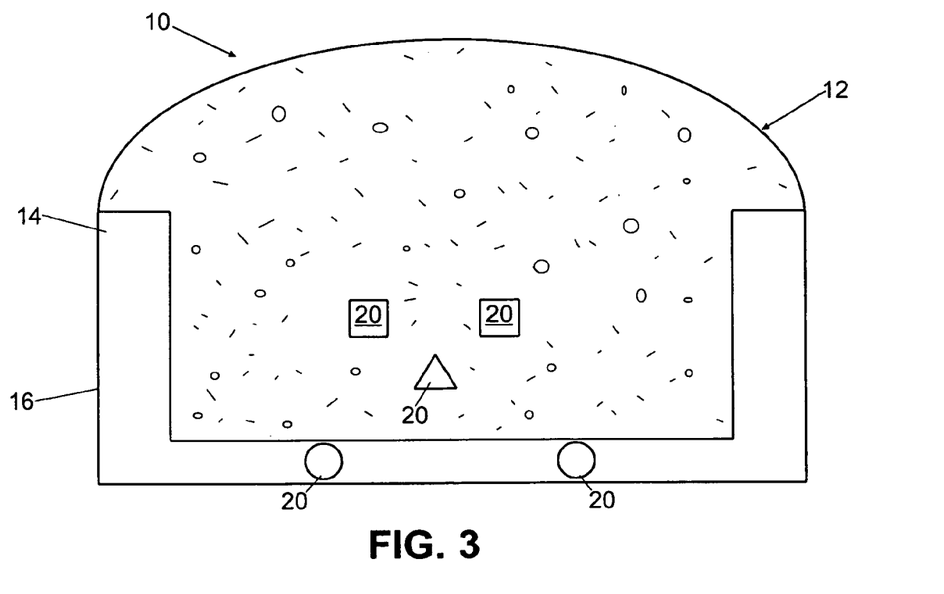
FIG. 3 is a side view of various coupling elements of the exemplary edging component.

Referring to FIG. 3, a side view of various coupling elements 20 is illustrated. The edging system 10 comprising multiple edging components 12 of various shapes and sizes is interconnected by the use of any variety of coupling elements 20. The coupling elements 20 can be located in the base 16, in the form 18 or in a combination of both. In one embodiment, the coupling element 20 can be a threaded fastener that is threadably adjusted to tighten the edging components 12 together. The coupling elements 20 can also be tongue and groove, dovetail, pin and rod, latch and pin, press fit, interference fit, and the like. The coupling members 20 facilitate the edging components 12 to be coupled and decoupled without being destroyed.

The landscape edging system 10 has the capacity to be reconfigured to match various landscape features. The landscape edging system 10 can be reused. The assembly of the landscape edging system 10 allows for a series of edging components 12 coupled end to end in a landscape edging pattern. The landscape edging pattern is repeatable, as well as allowing for variation along the pattern.

Figure 4:
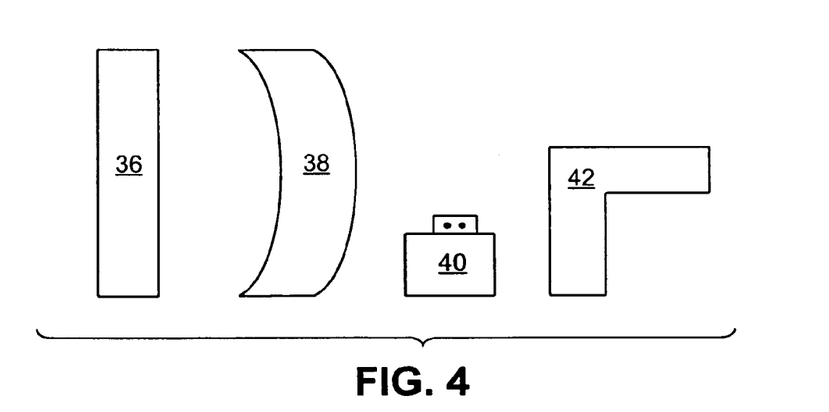
FIG. 4 is a top view of exemplary embodiments of various forms of edging components.
Figure 5:
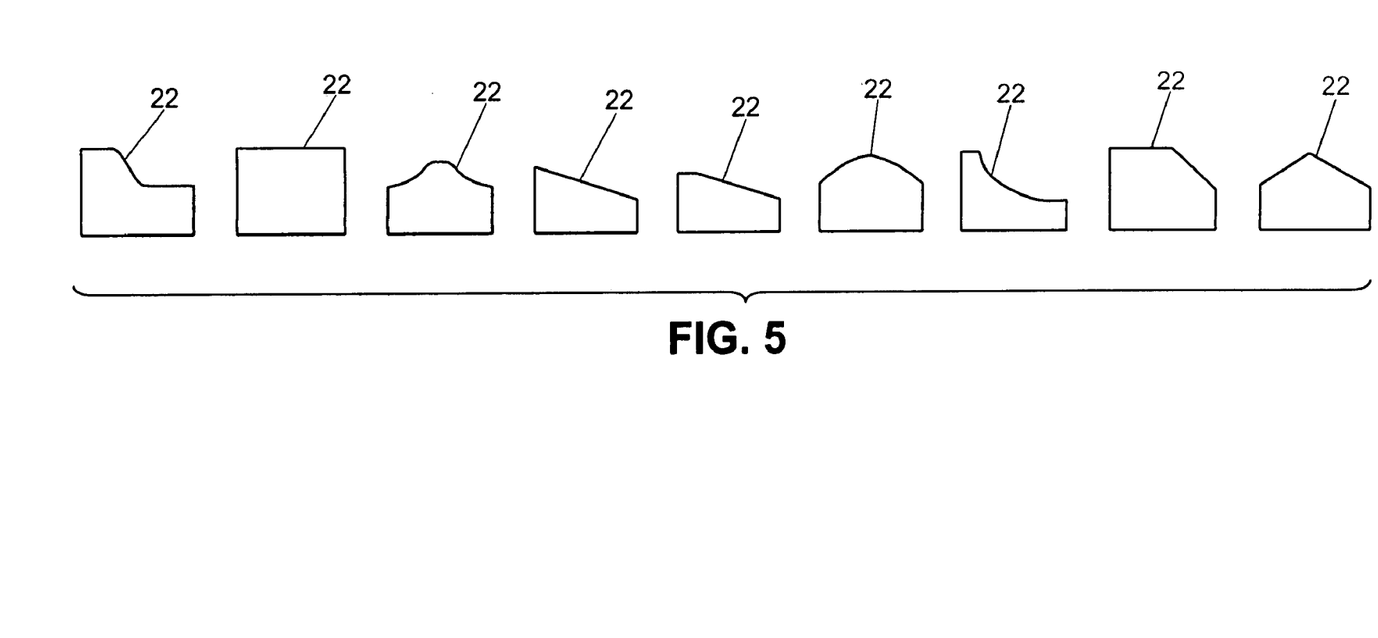
FIG. 5 is a side profile view of exemplary embodiments of various forms of edging components.
Figure 6:
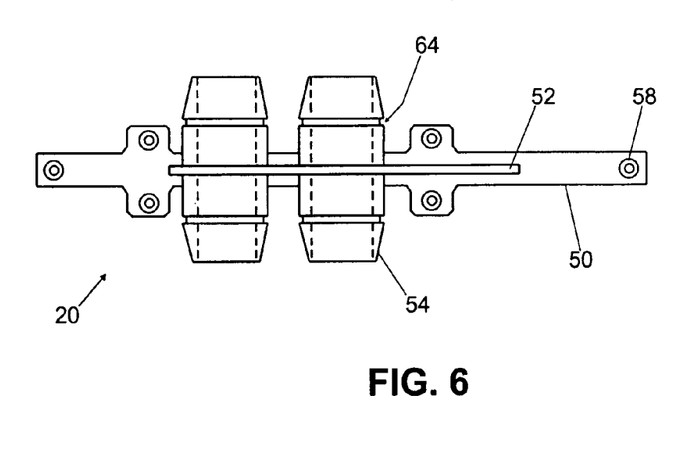
FIG. 6 is a top view of an exemplary coupling member.
Figure 9:
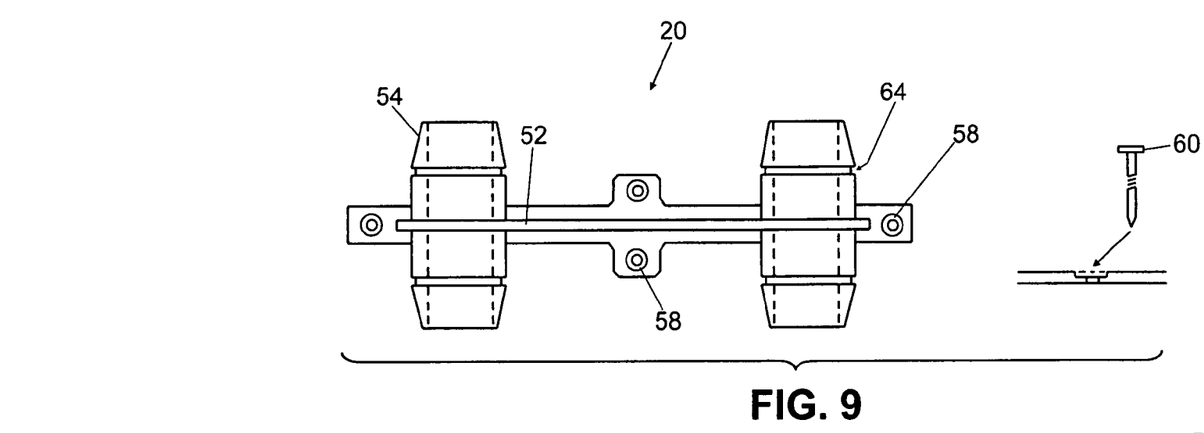
FIG. 9 is a top view of an exemplary coupling member.
Figure 10:
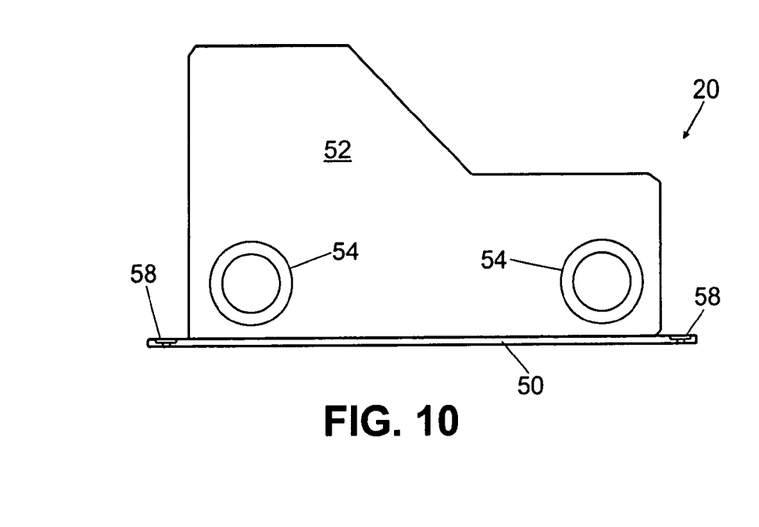
FIG. 10 is a side view of an exemplary coupling member.
Figure 11:
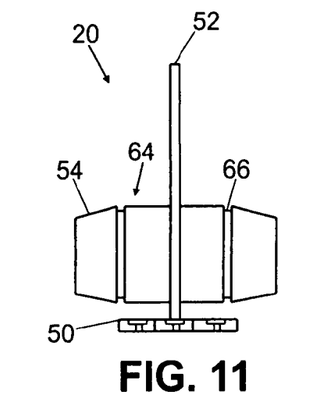
FIG. 11 is an end view of an exemplary coupling member.

FIGS. 4 and 5 illustrate examples of the shapes that the edging components 12 can take. The examples are not limiting in this disclosure. The edging component 12 can take virtually an infinite number of shapes. By way of example only and by no means limiting, the edging component 12 can be a straight shape 36, a curve shape 38, a stub end 40, a corner shape 42, and any variety of those shapes. FIG. 5 illustrates side views of various profiles of the top surface 22. Anchoring pins (see FIG. 9) can also be used in combination with the edging components, as well as other couplings to landscape features or ground features, such as soil, lawn, rocks, driveway materials, sidewalks and patios.

Figure 7:
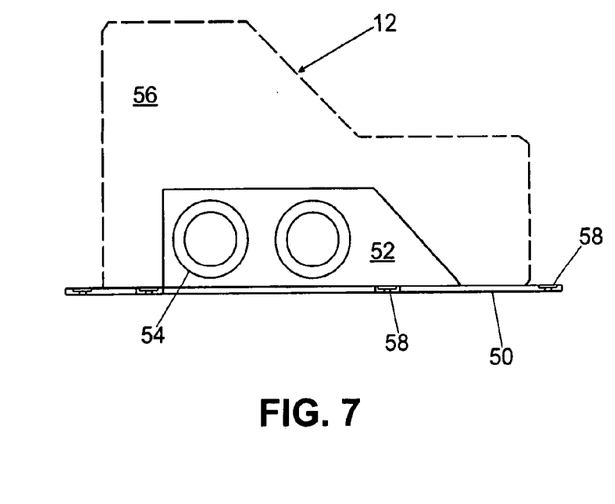
FIG. 7 is a side view of an exemplary coupling member.
Figure 8:
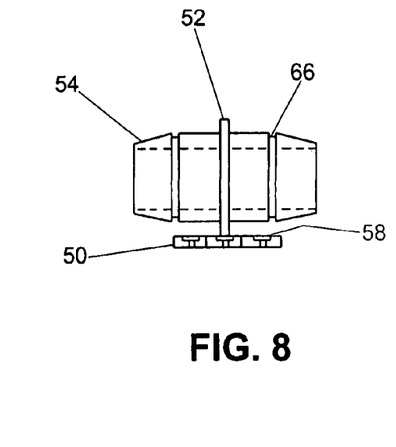
FIG. 8 is an end view of an exemplary coupling member.

FIGS. 6, 7, 8, 9, 10 and 11 illustrate an exemplary embodiment of a coupling member 20 and an edging component 12. The coupling member 20 includes a coupling base 50 configured to anchor to a ground feature (not shown). The coupling base 50 is mounted to a coupling side wall (or simply side wall) 52. The side wall 52 includes a mating portion 54. The side wall 52 extends distally from the coupling base 50 and is configured to mate to sides 56 of the edging component 12 via the mating portion 54. The side wall 52 is shown in FIG. 7 as having a smaller area than the edging component side 56. The side wall 52 can match the area of the edging component side 56. The mating portion 56 is configured to mate to the edging component 12. The coupling base 50 includes anchor tabs 58 that receive anchor pins 60 for anchoring the landscape edging system 10 to ground features. The anchor tabs 58 can be formed in the coupling base 50 or attached to or disposed on the coupling base 50.

Figure 12:
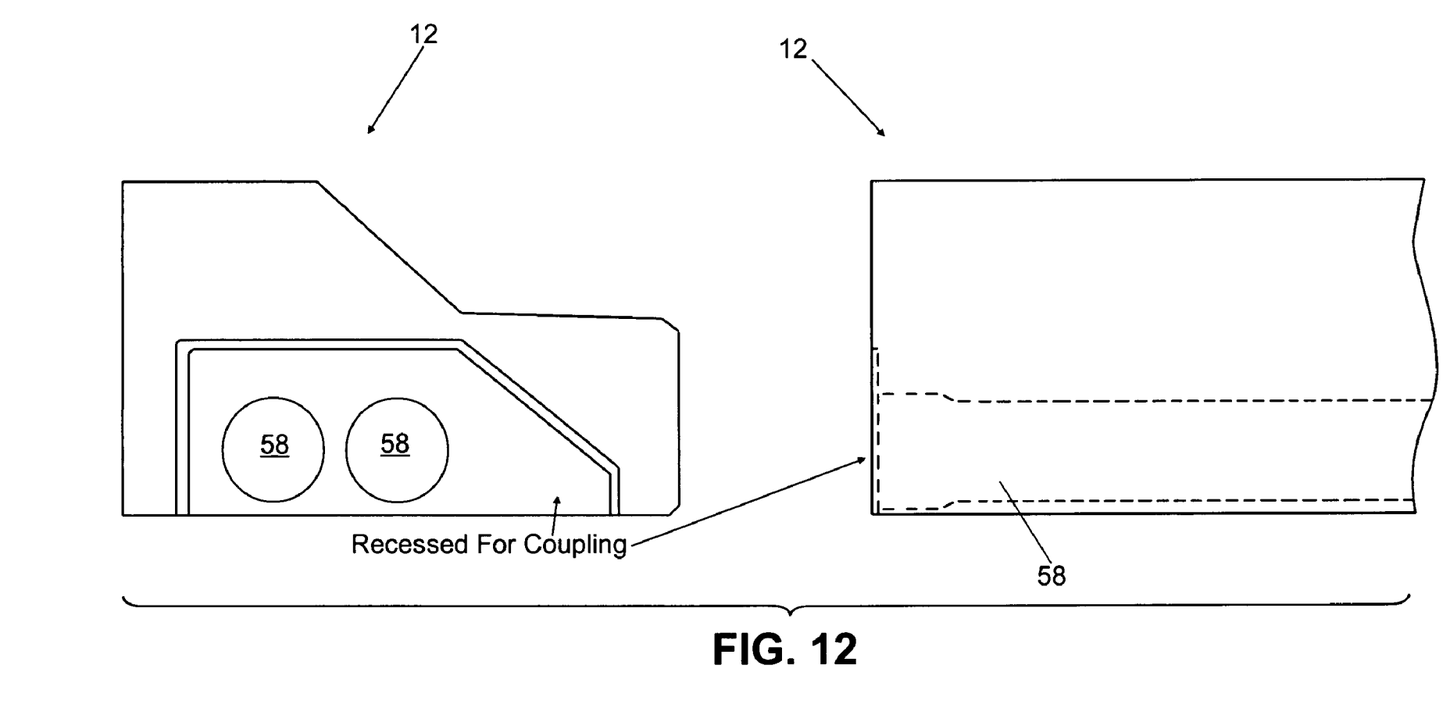
FIG. 12 is a schematic diagram showing the relationship of an exemplary coupling member and an exemplary edging component.
Figure 13:
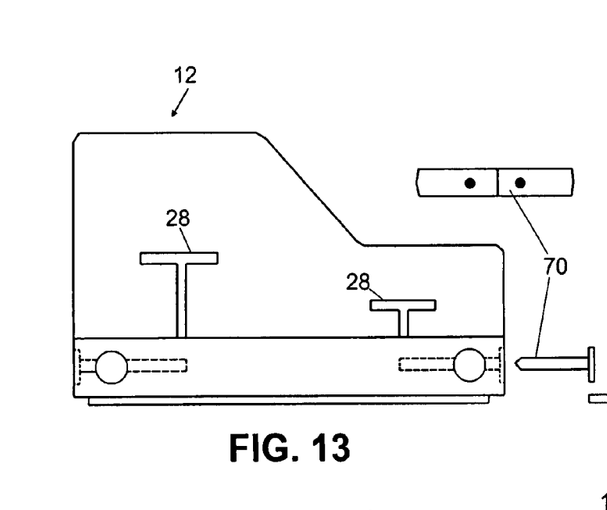
FIG. 13 is a side view of an exemplary coupling member with an edging component.
Figure 14:
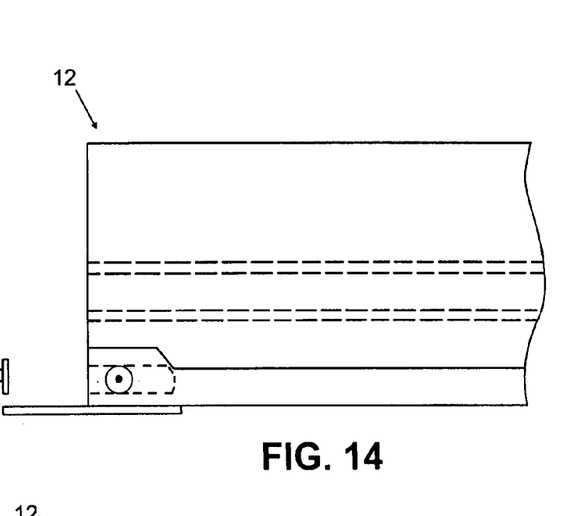
FIG. 14 is an end view of an exemplary coupling member with an edging component.
Figure 15:
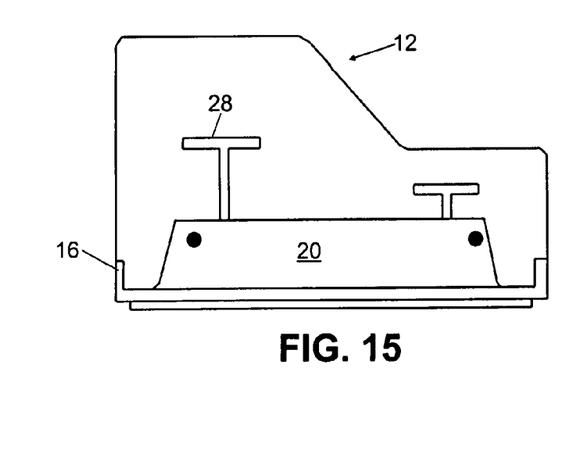
FIG. 15 is a side view of an exemplary coupling member with an edging component.
Figure 16:
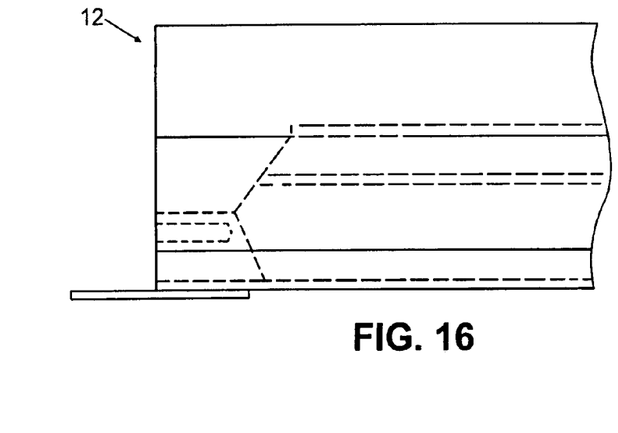
FIG. 16 is an end view of an exemplary coupling member with an edging component.
Figure 17:
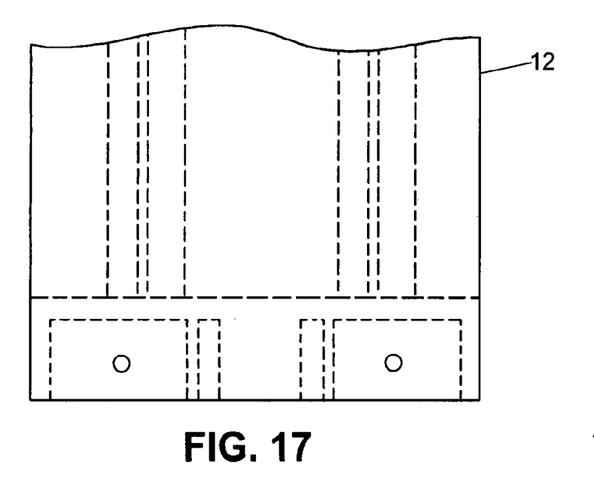
FIG. 17 is a top view of an exemplary edging component.
Figure 18:
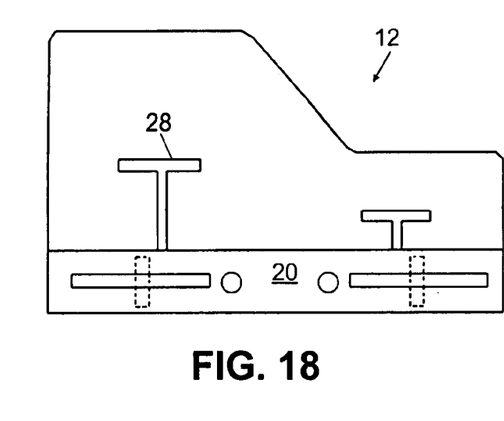
FIG. 18 is a side view of an exemplary coupling member with an edging component.
Figures 19, 20:
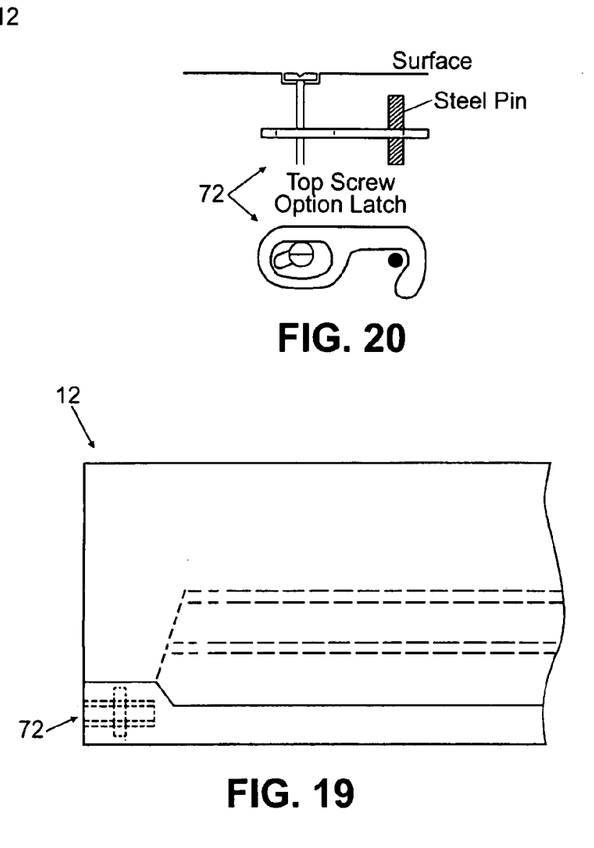
FIG. 19 is an end view of an exemplary edging component.
FIG. 20 is exemplary hardware for use with the exemplary coupling member of FIGS. 17, 18 and 19.
Figure 21:
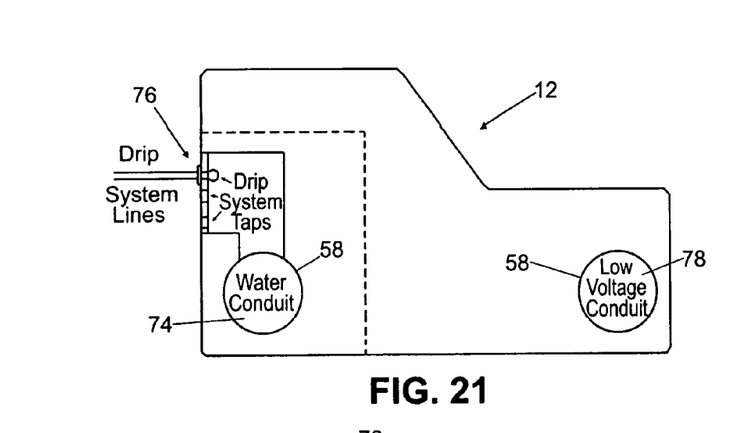
FIG. 21 is a side view of an exemplary edging component with body features.
Figure 22:
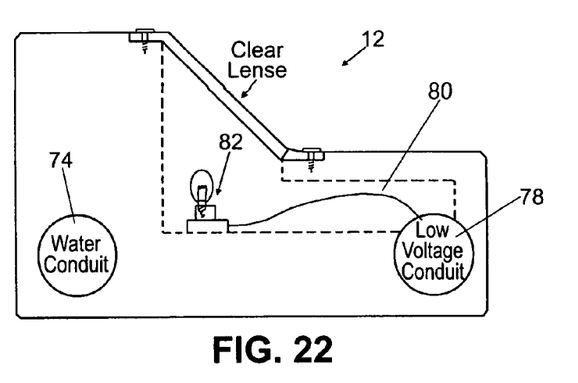
FIG. 22 is a side view of an exemplary edging component with body features.
Figure 23:
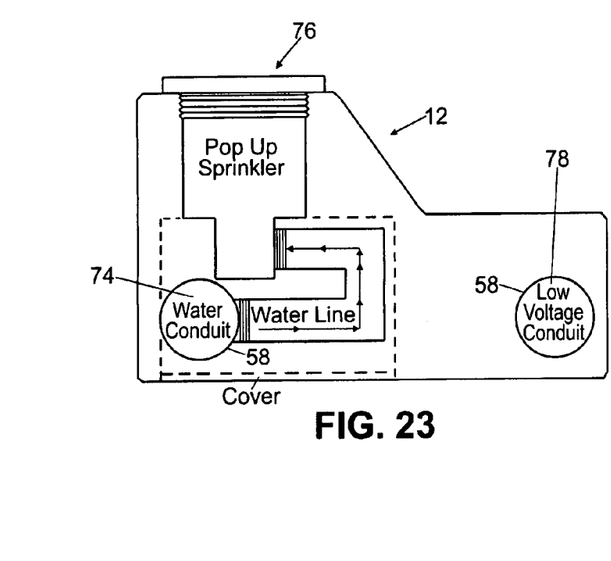
FIG. 23 is a side view of an exemplary edging component with body features.
Figure 24:
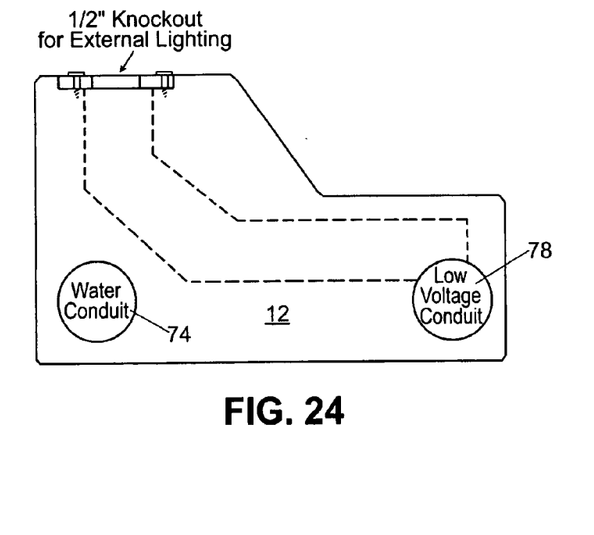
FIG. 24 is a side view of an exemplary edging component with body features.
Figure 25:
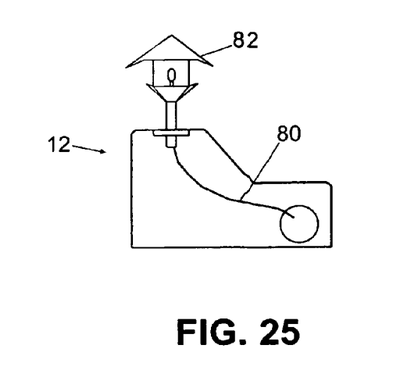
FIG. 25 is a side view of an exemplary edging component with light fixture.
Figure 26:
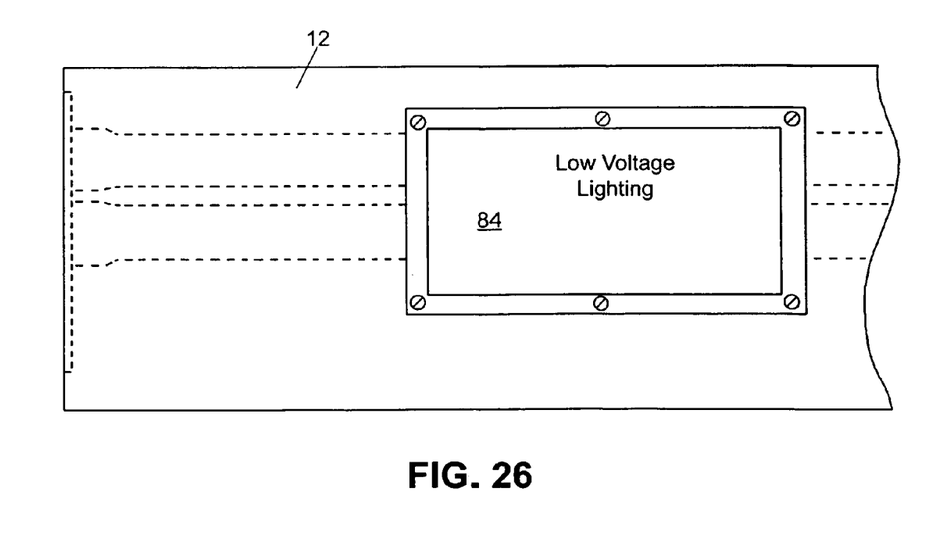
FIG. 26 is a top view of an exemplary edging component with an electrical access.

In an exemplary embodiment, the edging component 12 includes conduit 62 formed in the edging portion 12 (See FIG. 12). The conduit 62 forms a passage that communicates through the form 18 and allows for the flow of fluids or the passage of electrical or optical conductors through the edging component 12. The mating portion 54 can be configured to insert into the conduit 62 in a sealed condition. The mating portion 54 can include a seal 64 with a seal receiver 66 configured to receive an O-ring. The seal 64 can form a fluid tight boundary between the conduit 62 from one edging component 12 to another edging component 12. The sealed union eliminates infiltration of contaminants into the conduit 62. The conduit 62 can facilitate fluid flow and therefore be employed to carry irrigation water along the landscape edging system 10.

Referring also to FIG. 12 an exemplary edging component 12 is illustrated. The edging component 12 includes a recessed portion 68 that allows the coupling member 20 to fit into the edging component 12 flush. With the recessed portion 68, the edging components 12 can be mated together flush having minimal gap or voids between the edging components 12. The edging component 12 is shown with the conduit 58 configured to receive the mating portion 54 of the coupling member 20. In an exemplary embodiment, two conduits 58 are formed in the edging component 12 to facilitate fluid flow in one and electrical conduction in the other conduit 58. The conduit 58 can be formed in the form 18 or in the base 16, as well as be part of the stiffening members 24 or discontinuities 26 formed in the base 16.

Referring to FIGS. 13 through 19 exemplary embodiments of the edging component and the coupling member are illustrated. In FIGS. 13 through 16 the coupling member 20 is in the form of a rod and pin coupling 70. The exemplary embodiment shown in FIGS. 17 through 20 is a latch and pin coupling 72. The latch and pin 72 can be actuated from outside the edging component 12.

Referring to FIGS. 21 through 26 exemplary embodiments of the edging component are illustrated. The edging component 12 can include two conduits 58. A fluid conduit 74 is configured to fluidly couple the edging components 12 allowing for water to flow through the landscape edging system 10 to provide irrigation. Any variety of irrigation elements 76 can be coupled to the fluid conduit 74. A sprinkler head or a drip irrigation element 76 can be incorporated. An electrical conduit 78 can be included to electrically couple the edging components 12 allowing the flow of electricity through electrical conductors 80 to electrical fixtures 82. Access plates 84 can be mounted to the edging component 12 (see FIG. 26) in order to promote maintenance on the electrical portions.

Figure 27:
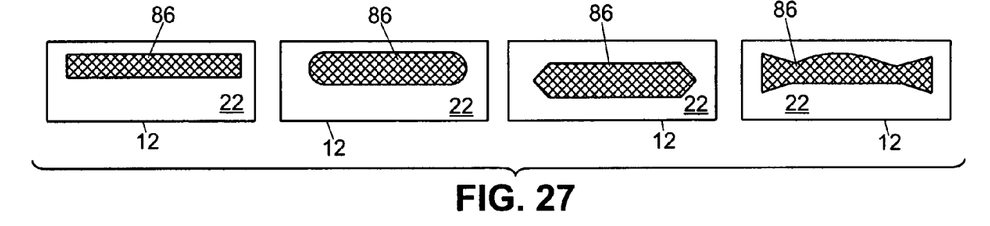
FIG. 27 is a top view of an exemplary edging component with various light fixtures.
Figure 28:
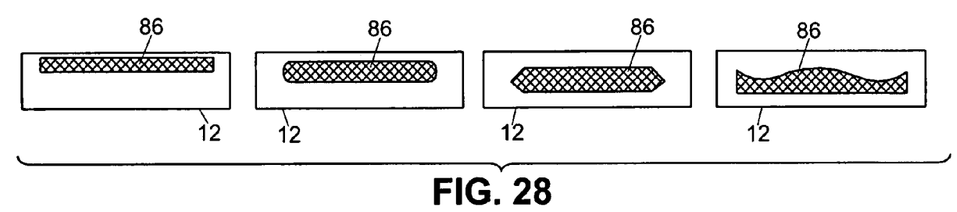
FIG. 28 is a top view of an exemplary edging component with various light fixtures.
Figure 29:
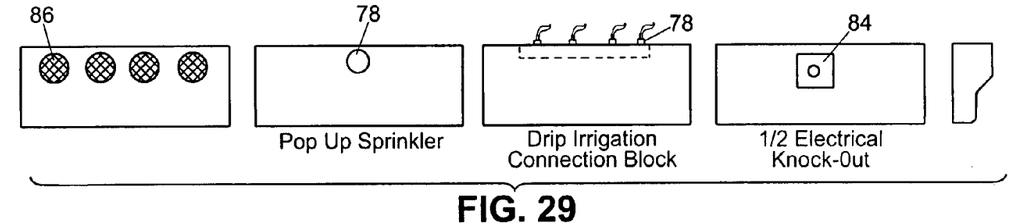
Figure 30:
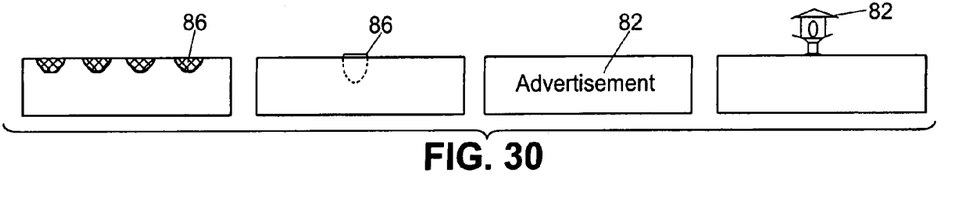
FIG. 30 is a side view of an exemplary edging component with various light fixtures.

FIGS. 27 through 30 illustrate a variety of exemplary embodiments of edging components. FIGS. 27 and 28 illustrates a variety of lens covers 86 mounted with the electrical fixtures 82. The lens covers 86 can be mounted flush with the top surface 22. In alternate embodiments, the lens covers 86 can be convex, concave, and the like. The lens covers 86 can also face away from the landscape features, toward landscape features, upward toward the sky and along the terrain of the earth. FIGS. 29 and 30 illustrate lens covers 83 as well as irrigation elements 78, and electrical fixtures 82. As discussed above, the fluid conduit 74 can be coupled to irrigation elements 78, such as pop-up sprinkler heads, drip irrigation elements, fountain nozzles, and the like. The electrical conduit 76 can be coupled to electrical fixtures 82, such as low voltage lights, spot lights, strobes, beacons, guide lights, pathway lights, advertisements, and the like.

The landscape edging system 10 can be versatile and provide a variety of functions while marking a boundary between landscape features. The various shapes can be interconnected and placed between landscape features, such as between a lawn and a flower bed. The lighting features can provide specialized light effects on the landscape features. The irrigation features can provide specific irrigation to each landscape feature. Fountains and spot lights or colored effects lights can be incorporated to provide a special effect to a specific landscape feature. The edge components can also be used as sidewalk and road curbing, as well as culvert and storm drain curbing. Special lighting for traffic control can be incorporated. The interconnected edging components can be fixed together and when one pleases, disconnected and rearranged into other configurations or moved to be placed in other landscape features without being destroyed. The edging system described herein provides both a sturdy lawn machine-friendly system, as well as a flexible and adaptable reusable system that is long lasting. While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A landscape edging system comprising:
a first edging component having a body including a base, said base including a first end and a second end opposite said first end and said base including an upper surface, a lower surface opposite said upper surface, and a plurality of sides forming a container in conjunction with said upper surface of said base; a form disposed on said upper surface of said base within said container, wherein said lower surface is configured to contact a ground feature, wherein said form includes at least one conduit disposed in said form; and
at least one coupling member configured to demountably couple with said first edging component proximate one of said first end and said second end, said at least one coupling member including a body having a side wall mounted on a coupling base, a mating portion disposed in said side wall and configured to couple with said first edging component, said coupling base configured to anchor to said ground feature, wherein said at least one coupling member is configured to promote a sealed union between said first edging component and another edging component and another edging component, wherein a fluid tight union is formed containing fluid within said conduit and preventing fluid infiltration into said conduit.

2. The landscape edging system of claim 1 wherein said at least one coupling member is configured to demountably couple with a second edging component forming a serial landscape edging pattern, said serial landscape edging pattern being repeatable.

3. The landscape edging system of claim 1, said at least one conduit configured to contain one of a fluid, an optical conductor and an electrical conductor.

4. The landscape edging system of claim 1 wherein said base and said form include a receiver configured to receive said at least one coupling member.

5. The landscape edging system of claim 1 wherein said at least one coupling member includes an O-ring seal.

6. The landscape edging system of claim 1 wherein said body includes a fluid conduit and an electrical conduit, said fluid conduit configured to fluidly couple with a fluid supply and said electrical conduit configured to electrically couple with an electrical supply.

7. The landscape edging system of claim 1 wherein said body includes a light mount, said light mount adapted to receive a light fixture, said light fixture being one of an internal fixture and an external fixture.

8. The landscape edging system of claim 1 wherein said body includes an irrigation mount, said irrigation mount adapted to receive irrigation components.

9. The landscape edging system of claim 1 wherein said body includes an electrical access cavity, said electrical access cavity configured to allow for service access to electrical equipment disposed in said body.

10. The landscape edging system of claim 1 wherein said form is concrete material.

11. The landscape edging system of claim 1 wherein said upper surface of said base comprises at least one discontinuity configured to provide strength and rigidity to said body.

12. The landscape edging system of claim 11 wherein said at least one discontinuity is an undulated discontinuity.

13. The landscape edging system of claim 11 wherein said at least one discontinuity is a T-shaped discontinuity.

14. The landscape edging system of claim 1 wherein said upper surface of said base comprises at least one stiffening member configured to provide strength and rigidity to said body.

15. The landscape edging system of claim 1 wherein said form comprises at least one reinforcement member configured to provide tensile strength to said first edging component.

16. The landscape edging system of claim 1 wherein said coupling base comprises at least one anchor tab configured to receive anchoring means for anchoring said coupling base to said ground feature.

17. The landscape edging system of claim 1 wherein said form comprises a bottom surface and a top surface opposite said bottom surface, said base conceals the entirety of said bottom surface.

* * * * *